(12) United States Patent
Zheng et al.

(10) Patent No.: US 9,106,352 B2
(45) Date of Patent: Aug. 11, 2015

(54) FREQUENCY DISTRIBUTION USING PRECISION TIME PROTOCOL

(75) Inventors: Qun Zheng, Surrey (CA); Thomas Geyer, Langley (CA); Tonghua Zhang, Burnaby (CA)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 837 days.

(21) Appl. No.: 13/405,529

(22) Filed: Feb. 27, 2012

(65) Prior Publication Data

US 2013/0227172 A1   Aug. 29, 2013

(51) Int. Cl.
*G06F 15/16* (2006.01)
*H04J 3/06* (2006.01)

(52) U.S. Cl.
CPC .............. *H04J 3/0641* (2013.01); *H04J 3/0658* (2013.01); *H04J 3/0667* (2013.01)

(58) Field of Classification Search
None
See application file for complete search history.

(56) References Cited

U.S. PATENT DOCUMENTS

2011/0158120 A1   6/2011   Hamasaki et al.
2013/0039220 A1*  2/2013   Ruffini et al. ............. 370/255

FOREIGN PATENT DOCUMENTS

WO    WO 2011/060965 A1    5/2011

OTHER PUBLICATIONS

ITU-T G.8265.1—Precision Time Protocol Telecom Profile for Frequency Synchronization, ITU-T Oct. 2010, the whole document.
IEEE-1588 2008—IEEE Standard for a Precision Clock Synchronization Protocol for Networked Measurement and Control System, IEEE, Jul. 24, 2008, the whole document.

* cited by examiner

*Primary Examiner* — Wing F Chan
*Assistant Examiner* — Padma Mundur

(57) ABSTRACT

A data network node is configured for operation as a time-transfer boundary clock, and has at least one time-transfer slave network interface and several time-transfer master interfaces, all configured for operation according to a time-transfer protocol. The data network node also includes a clock source interface configured for connection to a synchronous clock source supplied from a remote node, as well as a real-time clock (RTC) circuit. The RTC circuit supplies time-of-day data for time-transfer messages sent via the second network port and selectively operates in a first mode, wherein the RTC frequency is driven by a clock signal from the clock source interface, a second mode, wherein the RTC frequency is driven by a clock signal derived from time-transfer messages received by the time-transfer slave interface, and a third mode, wherein the RTC frequency is driven by a local clock signal from local clock source.

18 Claims, 7 Drawing Sheets

FREQUENCY DISTRIBUTION USING PRECISION TIME PROTOCOL

BACKGROUND

The present invention generally relates to systems for synchronizing clock frequencies in a computer network.

The Precision Time Protocol (PTP), as defined in the IEEE-1588-2008 standard entitled "Standard for a Precision Clock Synchronization Protocol for Networked Measurement and Control Systems," enables precise synchronization of clocks over a data packet network. In a nutshell, PTP is used to distribute a "grandmaster" clock's precise time-of-day to slave clocks. This is done using an exchange of PTP packets, which include timestamps carried inside. Slave clocks evaluate these timestamps to account for end-to-end delay, and can use the resulting timing information to obtain a local time-of-day aligned to the grandmaster with sub-microsecond precision, in some cases.

The IEEE 1588 standards describe a hierarchical master-slave architecture for clock distribution. In this architecture, an "ordinary clock" is a device having a single network connection. An ordinary clock can be the source of a synchronization reference, in which case it is known as a "master." Alternatively, an ordinary clock can be the destination of a synchronization reference, in which case it is known as a "slave." In contrast, a "boundary clock" has multiple network connections and can transfer synchronization from one network segment to another. The root timing reference in a system is called the "grandmaster." The grandmaster transmits time-synchronization information to slave clocks residing on its network segment. These slave clocks may include one or more boundary clocks, which can then transfer synchronized time to other clocks for which the boundary clocks serve as masters.

PTP can also be used to transfer a frequency reference over a network, i.e., to perform frequency synchronization as well as time synchronization among a grandmaster clock and one or more slave clocks. This frequency synchronization may be necessary to support a synchronous interface, such as Synchronous Ethernet (Sync-E) or the Synchronous Optical Network/Synchronous Digital Hierarchy (SON ET/SDH), for example. An International Telecommunication Union (ITU) recommendation ITU-T G.8265.1/Y.1365.1, published in October 2010, (referred to hereinafter as simply G.8265.1) contains a description of a "profile," compatible with IEEE 1588, for frequency distribution without timing support from the network.

The use of PTP for frequency synchronization is attractive for telecommunications providers because it enables mobile backhaul to support UMTS-FDD RAN and 3G RBS. However, with PTP profile G.8265.1, PTP grandmaster ordinary clocks (GMOC) are required to provide such frequency distribution. In most cases, a Global Positioning System (GPS) receiver is required as the primary reference clock input for such a GMOC. Furthermore, the slave-only ordinary clocks (SOOC) treat two or more GMOCs independently, and no inter-GMOC communication is allowed for synchronization and redundancy control. Also, no boundary clock is allowed in this profile.

Accordingly, improved techniques for frequency distribution are needed.

SUMMARY

Although boundary clock support for frequency distribution is under discussion in the Telecommunication Standardization Sector of the ITU (ITU-T), the current discussion is focused on the use of boundary clocks for fan-out. GMOC is still required in the proposals under discussion, and GPS receivers are required as the primary reference clock input.

Several embodiments of the present invention address these problems with the selective use of a mechanism called "Sync-E Syntonization." According to current ITU-T standardization activities, Sync-E (or other synchronous sources such as SONET/SDH) can be used as the physical layer clock input for PTP clocks to provide better phase distribution. However, current approaches require Sync-E support on all PTP clocks of a PTP network. In some embodiments of the present invention, on the other hand, the Sync-E Syntonization mechanism is used for frequency distribution across a PTP network in such a manner that Sync-E (or other synchronous source) input is only required at one PTP network entrance. No GPS or other GMOC-required primary reference clock is needed. In several embodiments of the invention, a graceful clock-redundancy model for PTP master clock and network path protection is provided.

Embodiments of the present invention include a data network node having at least one time-transfer slave network interface and several time-transfer master interfaces, all of which are configured for operation according to a time-transfer protocol. The data network node also includes a synchronous clock source interface, configured for connection to a synchronous clock source supplied from a remote node, as well as a real-time clock (RTC) circuit. The RTC circuit is configured to supply time-of-day data for time-transfer messages sent via the second network port and to selectively operate in a first mode, wherein the RTC frequency is driven by a clock signal from the clock source interface, a second mode, wherein the RTC frequency is driven by a clock signal derived from time-transfer messages received by the time-transfer slave interface, and a third mode, wherein the RTC frequency is driven by a local clock signal from local clock source.

This example data network node further includes a control circuit, which is connected to the network ports and the RTC circuit. The control circuit, which in some embodiments comprises a microprocessor coupled to a memory, is configured to manage a PTP process and to handle a variety of conditions regarding the frequency synchronization information available from the synchronous clock interface and the time-transfer slave interface. Accordingly, in several embodiments the control circuit is configured to determine whether the clock source interface is receiving a synchronous signal having at least a predetermined quality and whether the slave network port is receiving time-transfer messages having a frequency traceability flag indicating TRUE. In some cases, evaluating whether a received synchronous signal has at least a predetermined quality comprises simply determining whether the data network node has received a "do not use" indication corresponding to the synchronous signal, while in other cases an explicit quality level associated with the synchronous signal is compared to a threshold quality level.

The control circuit is further configured to control the RTC circuit to operate in the first mode during intervals in which the clock source interface is receiving a synchronous source signal having at least the predetermined quality. The control circuit controls the RTC circuit to operate in the second mode during second intervals in which the first network port is receiving time-transfer messages having a frequency traceability flag indicating TRUE and the clock source interface is not receiving a synchronous source signal having at least the predetermined quality, and in the third mode during intervals in which the clock source interface is not receiving a synchronous source signal having at least the predetermined quality and the first network port is not receiving time-transfer messages having a frequency traceability flag indicating TRUE. Finally, the control circuit also sets frequency traceability flags in time-transfer messages sent via the second network port to a first value, indicating TRUE, when the RTC circuit is operating in the first mode and when the RTC circuit is operating in the second mode and a traceability indication received in the time-transfer messages indicates TRUE, and to a second value, indicating FALSE: (a) when the RTC circuit is operating in the third mode; and (b) when the RTC circuit is operating in the second mode and the traceability indication received in the time-transfer messages indicates FALSE.

In some embodiments, the time-transfer protocol supported by data network node 400 is compliant to the Precision Clock Synchronization Protocol specified by IEEE Standard 1588-2008, and may also be compliant with the G8265.1. However, in other embodiments control circuit 460 is instead adapted to support a different time-transfer protocol, or a modified version of the IEEE 1588 protocol. Likewise, in some embodiments the clock source interface 450 is a synchronous Ethernet interface configured to operate as a synchronous Ethernet slave clock, but in others the clock source interface 450 is a Synchronous Optical Networking (SONET) interface or a Synchronous Digital Hierarchy (SDH) interface, or some other synchronous interface.

The operating intervals discussed above do not necessarily represent all of the operating intervals of the node. In some embodiments, for example, the control circuit is further configured to control the RTC circuit to operate in the second mode during debounce intervals that immediately follow reestablishments of previously lost synchronous source signals.

In several embodiments, the control circuit is further configured to control the RTC circuit to update time-of-day during intervals in which the data network node is not receiving time-transfer messages by using the synchronous signal from the clock source interface, when the synchronous signal is available, and by using the local clock signal when the clock signal from the clock source interface is not available.

In some embodiments, the data network node described above is capable of selective operation in either BC-S or BC-P mode. Accordingly, in some embodiments, the control circuit is further configured to disable the time-transfer slave interface and operate in a primary boundary clock mode, responsive to an externally supplied configuration command. When operating in primary boundary clock mode, the control circuit is configured to control the RTC circuit to operate in the first mode during fourth intervals in which the clock source interface is receiving a synchronous source signal and in the third mode in fifth intervals in which the clock source interface is not receiving a synchronous source signal, and to set frequency traceability flags in time-transfer messages sent via a master network port to a first value, indicating TRUE, when the RTC circuit is operating in the first mode, and to a second value, indicating FALSE, otherwise. In these embodiments, the control circuit is also configured to set a grandmaster clock ID field and a sending clock ID field to the same value in each Announce message sent via a master network port, when operating in BC-P mode.

Slave-only ordinary clock embodiments are also described in detail below, as are methods corresponding to the all of the data network nodes summarized above.

Of course, the present invention is not limited to the above-summarized features and advantages. Indeed, those skilled in the art will recognize additional features and advantages upon reading the following detailed description, and upon viewing the accompanying drawings.

DETAILED DESCRIPTION

The invention will now be described more fully hereinafter with reference to the accompanying drawings, in which examples of embodiments of the invention are shown. This invention may, however, be embodied in many different forms and should not be construed as limited to the embodiments set forth herein. It should also be noted that these embodiments are not mutually exclusive. Thus, components or features from one embodiment may be assumed to be present or used in another embodiment, where such inclusion is suitable.

For purposes of illustration and explanation only, several embodiments of the present invention are described herein in the context of a network node that uses the Precision Time Protocol (PTP). It will be understood, however, that the present invention is not limited to such embodiments and may be implemented in connection with other time-transfer protocols, whether or not those protocols are related to the IEEE 1588-2008 standard or not.

Likewise, embodiments of this invention are described below in the context of a telecommunications environment, such as in a backhaul application. In particular, many of the PTP-related concepts discussed below, such as static BMCA, unicast transport, etc., follow the ITU-T G.8265.1 telecom profile. Again, however, the present invention is not limited to these embodiments and is not necessarily limited to telecommunications applications or to applications compliant with the ITU-T G.8265.1 profile.

Figure 1:
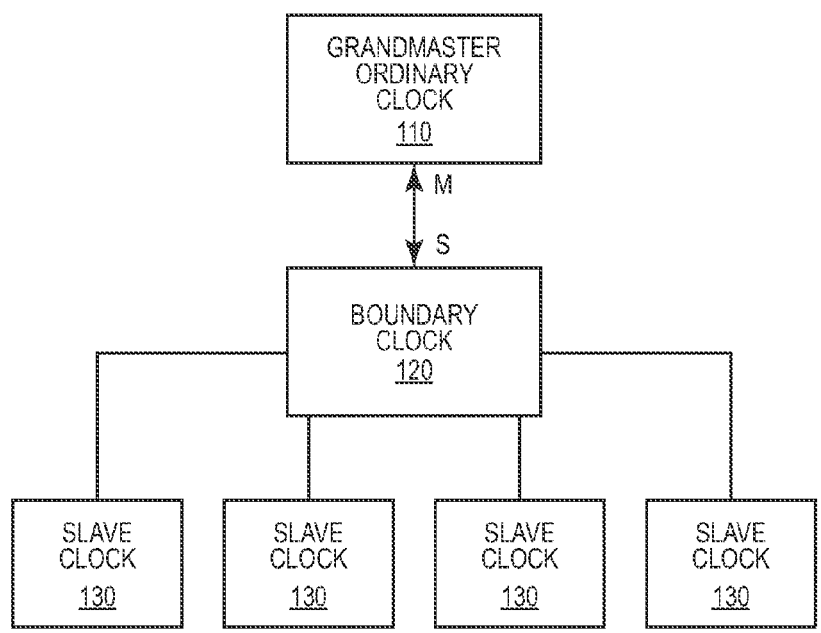
FIG. 1 is a schematic diagram illustrating several components of a network utilizing the Precision Time Protocol standard.

FIG. 1 is a schematic diagram illustrating several components of a network utilizing the PTP standard. This figure illustrates the hierarchical nature of the PTP architecture. A grandmaster ordinary clock 110 sits at the top of the hierarchy, serving as a primary reference for the network. The grandmaster ordinary clock 110 is typically coupled to a GPS receiver, which provides a highly accurate time-of-day and may also provide a highly accurate frequency reference.

In a conventional PTP architecture, Grandmaster ordinary clock 110 serves as a master to a boundary clock 120, which in turn serves as a master to one or more slave clocks 130. An accurate time-of-day can be transferred from the grandmaster ordinary clock 110 to boundary clock 120, and then to each of the slave clocks 130, using exchanges of special time-stamped messages, as defined in the IEEE 1588 specification.

Figure 2:
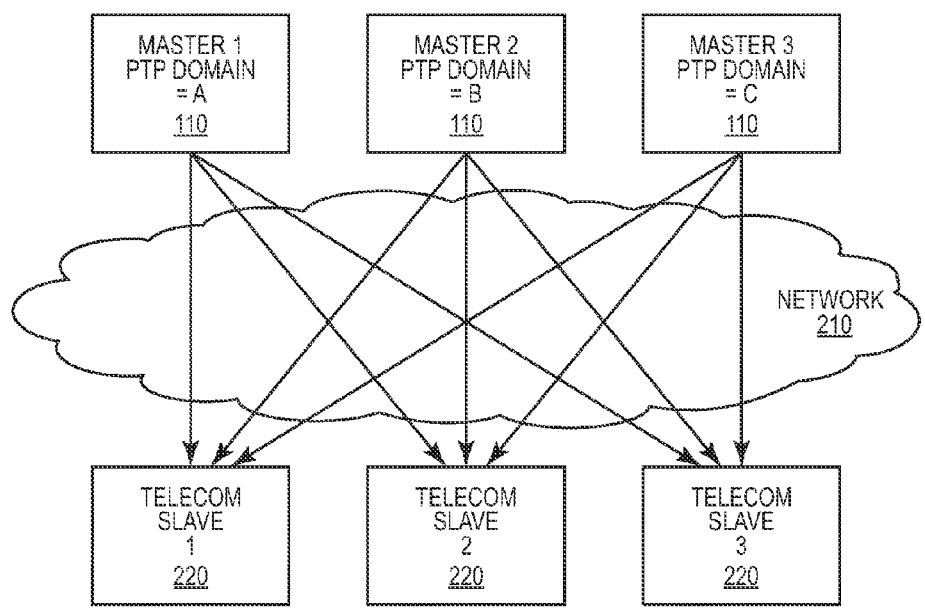
FIG. 2 illustrates the relationships among multiple grandmaster ordinary clocks and slave clocks in a conventional telecom model.

The ITU-T G.8265.1 profile, which is intended to augment the IEEE 1588 specifications to address implementations in a telecommunications network, addresses only ordinary clocks as defined in IEEE 1588, and considers boundary clocks to be "out-of-scope." The G.8265.1 profile does allow for multiple master clocks, each of which is a grandmaster ordinary clock according to the IEEE 1588 specifications. FIG. 2 illustrates the relationships among multiple grandmaster ordinary clocks and slave clocks in a conventional telecom model. Each slave clock 220 can "listen" to multiple master clocks 110, across network 210, by using several independent ordinary clock instances running simultaneously. Each master clock 110 belongs to a different PTP domain, and thus each slave ordinary clock instance in slave clocks 220 belongs only to a single domain. The G.8265.1 profile describes a clock master selection process for the slave clocks, in which a slave typically chooses the master clock having the highest quality level, as indicated by the clockClass attributes carried by Announce messages sent by the master clocks.

By definition of IEEE-1588 2008, a GMOC has a single slave port. The G.8265.1 profile does not address boundary clocks, and describes only multi-cast operation for frequency distribution. In several embodiments of the present invention, a boundary clock with a pseudo-GMOC instance inside is used to support both fan-out and redundancy.

Figure 3:
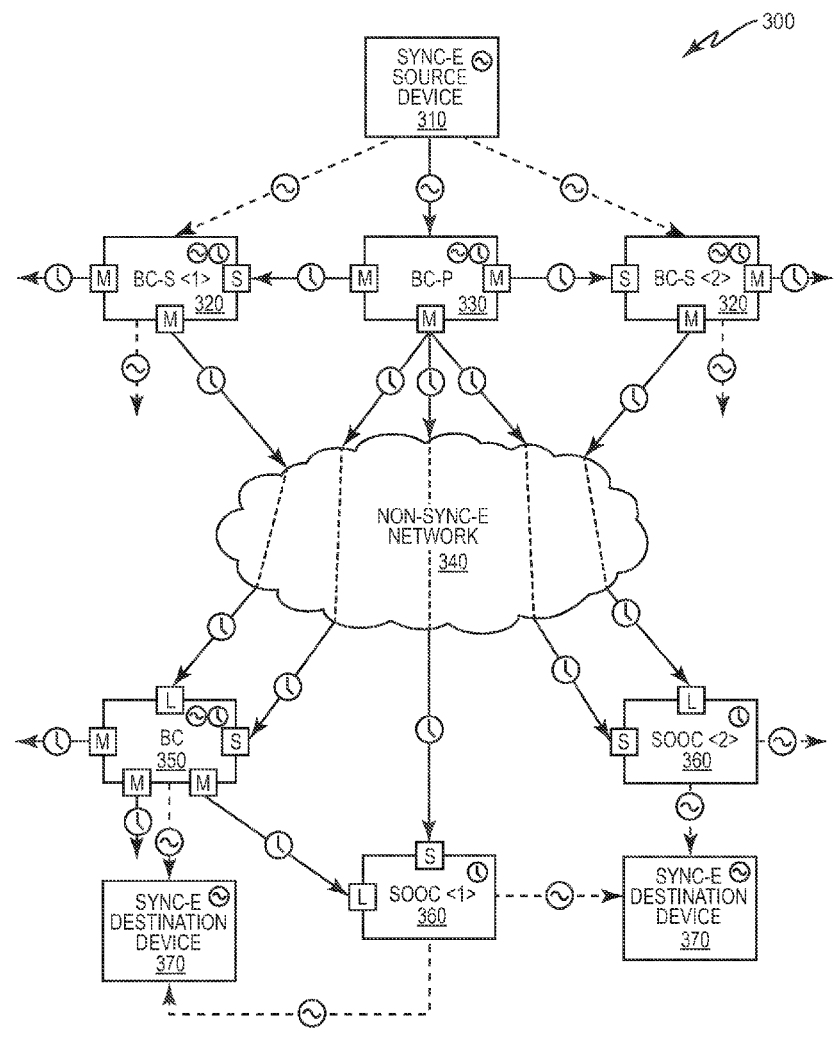
FIG. 3 is a schematic diagram of a network in which clock frequencies are synchronized according to the techniques of the present invention.

FIG. 3 is a schematic diagram of a network 300 in which clock frequencies are synchronized according to the techniques of the present invention. The ultimate frequency reference in network 300 is Sync-E source device 310, which provides a synchronous clock signal to each of boundary clocks 320 and 330, via Sync-E frequency division. (Those skilled in the art will appreciate that the Sync-E links in FIG. 3 could be replaced with SONET/SDH links, in an alternative embodiment of network 300.)

Boundary clocks 320, which appear to the upper left and upper right of FIG. 3, are operating in a "secondary" mode, and are thus identified in the figure as BC-S <1> and BC-S<2>. Boundary clock 330 is operating in a "primary" mode, and is thus identified in the figure as BC-P. As described in detail below, however, these boundary clocks may have the same physical structure but operate in different modes, in some embodiments.

Each of boundary clocks 320 and 330 is configured to distribute time and frequency to one or more slave devices over a non-Sync-E network 340, using PTP. In FIG. 3, for example, boundary clock 330 can transfer time and frequency to PTP boundary clock 350 and multiple slave ordinary clocks 360. Boundary clock 350 can further transfer PTP time and frequency to one or more slave ordinary clocks 360. Still further, boundary clock 350 and slave ordinary clocks 360 can each further transfer frequency to one or several Sync-E destination devices 370 using Sync-E frequency distribution. Accordingly, FIG. 3 illustrates that frequency synchronization traceable to an original Sync-E source can be transferred across a non-Sync-E network 340 to multiple PTP devices as well as to Sync-E destination devices that are coupled to those PTP devices.

As noted above, boundary clocks 320 and 330 may have the same physical structure, such that either node is capable of operating in multiple modes. In some embodiments of the present invention, a pseudo-grandmaster ordinary clock instance in a boundary clock is instantiated on the boundary clock at initialization time. There are two different modes of such a GMOC runtime, which are selectively configurable: a primary mode and a secondary mode. In FIG. 3 and the discussion that follows, "BC-P" refers to such a boundary clock in primary mode, while "BC-S" refers to a boundary clock in secondary mode.

For a BC-P according to several embodiments of the present invention, all PTP ports are master ports. Because time-of-day is not available from a slave port or from a coupled GPS receiver, an arbitrary time-of-day may be chosen after the grandmaster ordinary clock is instantiated. The boundary clock includes a PTP local clock that uses a Sync-E source (or other synchronous source) as the input for local clock frequency reference. (This is contrasted to the normal case for a PTP slave, where the PTP local clock uses a frequency derived from received PTP timestamps as the input frequency source.) The time-of-day, which is maintained by a real-time-clock (RTC), needs to be driven by the same input clock source as well.

All the master ports of the BC-P will behave as normal boundary clock master ports for either unicast or multicast transport support on the network for PTP clients to synchronize to. The behavior is similar to the ones described in the ITU-T G.8265.1 grandmaster ordinary clock case, but with several exceptions. First, the BC-P may have more than one PTP master port, compared to a regular grandmaster ordinary clock that only allows one master port as specified in IEEE-1588 2008. Second, the PTP local clock in the BC-P is derived directly from a synchronous physical clock source, not necessarily a GPS receiver or the like. No time-of-day input for the BC-P is required. However, an optional feature would be to allow the time-of-day to be synchronized to another well-known time source, such as a NTP or another PTP server, at instantiation time. Third, although the BC-P is running as a boundary clock, it appears to be no different from a conventional grandmaster ordinary clock from the point of view of a downstream PTP clock. For instance, in the Announce messages sent to downstream PTP clocks, the grandmaster clock ID and the sending clock ID are the same. The BC-P's master ports can support unicast-negotiation, static-unicast, or even multicast.

An additional requirement for the use of the BC-P is that only one such BC-P is allowed in the network for each PTP domain. As shown in FIG. 3, a BC-P node along with several BC-S nodes form a boundary clock cluster for distributing synchronous clock source frequency throughout a data network.

The clock class used in the Announce messages sent downstream from the BC-P is derived from a preconfigured mapping table. One example of such a mapping table is described in G.8265.1's Table 1, titled "Mapping of Quality Levels to PTP clockClass values." The frequencyTraceable bit in the flagField of a generic PTP message header sent from the BC-P is set to TRUE.

A boundary clock operating in secondary mode has several features that differ from the BC-P. For example, for the BC-S, not all PTP ports are master ports. Instead, one or more PTP ports are configured to be in slave port mode. If multiple slave ports are configured, one of the slave ports will be chosen as the active slave port, using a master clock selection algorithm. (An example algorithm is described below.) This slave port then receives a PTP master reference source that should ultimately derive from the BC-P of the PTP domain. Before such a BMCA designation and BC-P synchronization, all the master ports of the BC-S should be in passive state, so that the master ports do not interact with the network with PTP messages. All the BC-S in a given PTP domain must use the same Sync-E (or other type of synchronous source) as the BC-P uses.

The BC-S then provides two main functions. First, the BC-S provides redundancy protection for downstream PTP clocks, such as clocks 350 and 360 in FIG. 3. Second, the BC-S provides further fan-out for better downstream PTP clock scalability. A BC-S needs to be in reversion mode (see the logic defined in G.8265.1) to support clock and path redundancy. In theory, a network can support as many BC-S as an operator wants. In practical implementations, however, between one and four BC-S should be enough for redundancy purpose.

One advantage of the boundary clock and network architecture described above is the support for redundancy. If a BC-S loses the PTP connection with the BC-P or is experiencing excessive PTSF from the BC-P, but a Sync-E (or other designated synchronous source) source is OK, the BC-S will switch to a partial-holdover state, where the time-of-day is updated by the PTP local clock and the PTP local clock is still driven by the Sync-E (or other synchronous source) clock. The clock class for outgoing PTP messages can be maintained the same, since the real physical clock source does not change. If the BC-P PTP connection is reestablished, an optional timeout may be implemented for debouncing control. After such a debounce, the BC-S should synchronize back to the BC-P for the time-of-day again.

If a BC-S loses the Sync-E (or other designated synchronous source) input, but the PTP connection is OK, the BC-S will switch to use a PTP timestamps-driven mechanism for local clock frequency reference input. However, during the time interval in which this is done, the frequencyTraceable bit in the flagField of PTP message headers for messages sent from the master ports is set to match the frequencyTraceable bit in messages received at the BC-S slave port. Additionally, an alarm can be raised to alert operator for clock source disruption, in some embodiments. If the Sync-E (or other designated synchronous source) input is restored, an optional timeout may be implemented for debouncing control. After such a debounce, the BC-S should synchronize back to the source again. The frequencyTraceable bit can be restored back to TRUE, and any previous raised alarm can be cleared, as well.

The BC-P behavior is different. If the BC-P loses the Sync-E (or other designated synchronous source) input, the RTC should operate in a holdover mode, where it attempts to maintain a steady frequency based on information about the local clock derived from previous history with the synchronous source signal, and should set the frequencyTraceable bit in the flagField of a generic PTP message header in outgoing PTP messages to FALSE. The logic is similar to the BC-S losing Sync-E case. If a BC-S detects the receive PTP messages from the BC-P has the frequencyTraceable bit in the flagField set to FALSE, it will behave in the same way as it does when it loses the BC-P PTP connection.

If a BC-S loses both PTP connection to the BC-P and Sync-E (or other designated synchronous source) input, the BC-S will switch to full holdover state, will set the frequencyTraceable bit in outgoing PTP messages to FALSE, and will lower down the clock class value in sent Announce messages from its master ports to a pre-defined value as specified in the PTP profile specific "Mapping of SSM Quality Levels to PTP clock class". For example, in G.8265.1 case for G.781 Option II, if the PTP local clock holdover is Stratum 3 based, the value would be 102 (QL-ST3, SSM–QL=0×0A, refer to G.8265.1), or 110 (QL_DUS) if the original Sync-E SSM-QL is lower than/equal to (0×0A, QL–ST3).

A slave to a BC-S or a BC-P can be either an boundary clock or a slave-only ordinary clock. For redundancy, a slave can track multiple BC-S and possibly also the BC-P. As seen in FIG. 3, the slave clocks can be in a network without Sync-E from the original source used by the BC-P.

The best master clock algorithm of the slave should be modified relative to those specified in IEEE 1588 and G.8265.1. In particular, if a synchronous clock signal having at least a predetermined quality level is not available, the clock selection algorithm should use the frequencyTraceable bit in the flagField as the primary selection criteria for choosing among PTP masters, before clock quality (clockClass). Following is a list of parameters in a priority order to illustrate how the BMCA selection criteria could be implemented. Of course, other priority orders are possible. First, the selected master should have no packet timing signal fail (PTSF). Second, the frequencyTraceable bit in the flagField in the received Announce message is TRUE. Third, the master(s) having a better clock class should be prioritized. Fourth is a locally administered priority level for each tracking master references (BC-S/BC-P or BC). Fifth are other tie-breakers.

One reason to use BC-P and BC-S together for frequency distribution is to allow smooth master clock reference source switchover in case the primary reference source lost from a slave clock point of view. However, if slave clocks in a PTP network can track PTP master reference sources with the same frequency source, but different phase source (e.g., local free run clock to start with), and switching the PTP sources with smooth frequency transition, then the BC-S PTP clocks are not required, and multiple BC-P can be utilized to support such master reference source redundancy.

The mechanisms described above provide an advantageous approach for plesiochronous frequency distribution through a packet network. This approach provides several advantages comparing to existing PTP technologies. First, the techniques described above yield boundary clock support for frequency distribution, with better scalability. Second, no GPS receiver or the like are required to equip a grandmaster ordinary clock for the frequency distribution. Third, the described system provides controlled redundancy for master clock and path protection. Finally, the system provides downstream client slave clock transparency on the quality of the recovered frequency through PTP protocol.

Figure 4:
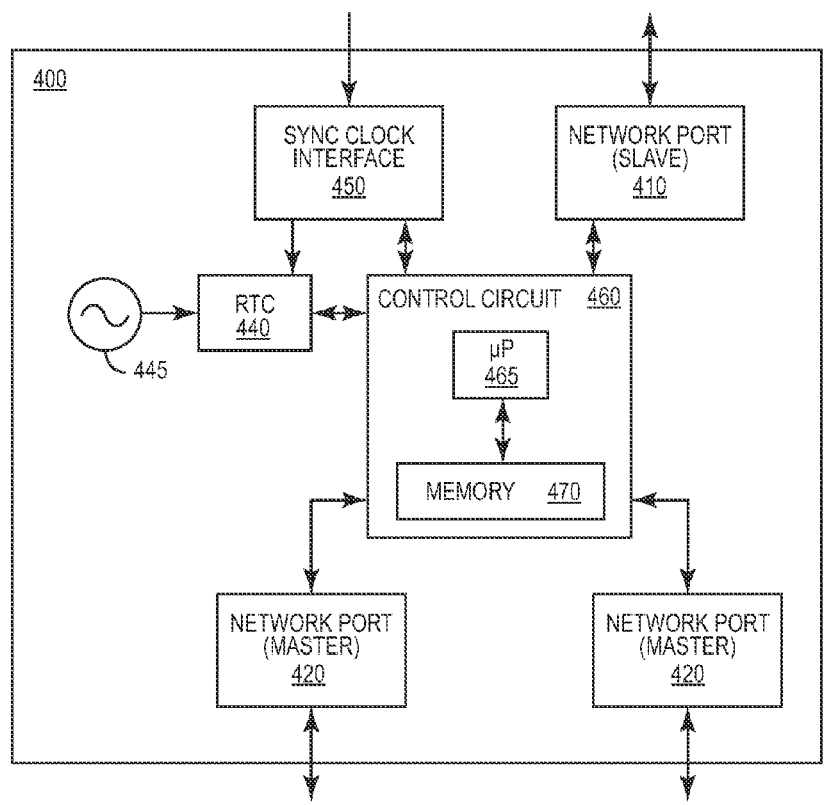
FIG. 4 is a block diagram illustrating some of the components of an example network node according to some embodiments of the invention.

FIG. 4 is a block diagram illustrating some of the components of an example data network node 400, according to some embodiments of the invention. Data network node 400 includes a synchronous clock source interface 450, which is configured for connection to a synchronous clock source supplied from a remote node. Data network node 400 also includes at least one time-transfer slave network port 410, and several time-transfer master interfaces 420, which are configured for operation according to a time-transfer protocol. A real-time clock (RTC) circuit 440 is configured to supply time-of-day data for time-transfer messages sent via the second network port and to selectively operate in a first mode, wherein the RTC 440 frequency is driven by a clock signal from the clock source interface 450, a second mode, wherein the RTC 440 frequency is driven by a clock signal derived from time-transfer messages received by the time-transfer slave interface 410, and a third mode, wherein the RTC 440 frequency is driven by a local clock signal from local clock source 445.

Those skilled in the art will appreciate that an RTC in a PTP node needs two inputs for normal operation: an electrical frequency clock reference, and a time-of-day alignment for each second boundary. The former can be obtained from either a Sync-E (or other sync-source) input, or local clock crystal oscillator 445. The time-of-day alignment can be obtained by PTP messages from a master reference clock, or can be arbitrarily maintained in a node that has no PTP master reference.

When the RTC uses a valid Sync-E source as the electrical frequency reference, the local clock is traceable with designated clock quality specified in the Sync-E signaling, i.e., using a SSM message. In this case, the PTP reference is only used to recover the time-of-day information for the local clock. This is the best case for frequency distribution from clock quality point of view. This mode is also called hybrid mode, or Sync-E syntonization, in the PTP context. From the point of view of the local clock, the PTP clock is not useful if the time-of-day is not consumed anywhere, because the frequency is already solely controlled by the electrical reference clock. The reason to support PTP in this case is to further distribute the frequency information to downstream clocks that do not have the Sync-E source as the input reference.

However, if no synchronous electrical frequency reference available, or if no synchronous source reference meeting a minimum threshold quality is available, the PTP reference can be used to provide both the electrical clock reference (through a dedicated circuitry to drive the local oscillator for the electrical frequency reference), and the time-of-day reference. In this case, the electrical clock reference may not be as good as the real synchronous source, due to algorithm accuracy/responsiveness issues and noise.

In accordance with some embodiments of the invention, then, data network node 400 further includes a control circuit 460, which is connected to the network ports 410 and 420 and the RTC circuit 440. Control circuit 460, which in the pictured embodiment comprises a microprocessor 465 coupled to a memory 470, is configured (e.g., with computer program instructions stored in memory 470) to manage a PTP process and to handle a variety of conditions regarding the frequency synchronization information available from the synchronous clock interface and the time-transfer slave interface. In several embodiments control circuit 460 is configured to determine whether the clock source interface is receiving a synchronous signal having at least a predetermined quality level and whether the slave network port is receiving time-transfer messages having a frequency traceability flag indicating TRUE. In some cases determining whether a received synchronous source signal has at least the predetermined quality level may be as simple as determining whether the data network node 400 has received a "do not use" indication corresponding to the synchronous source signal. In other embodiments, a quality level corresponding to the synchronous source signal is compared to a threshold quality level to determine whether it is good enough to use. In still others, a quality level corresponding to the synchronous source signal is compared to a quality level for PTP messages received on the node's slave port, to determine whether the synchronous source signal should be favored over the PTP messages.

Control circuit 460 is further configured to control the RTC circuit 440 to operate in the first mode during intervals in which the clock source interface is receiving a synchronous source signal having at least a predetermined quality level. (In some embodiments, the RTC circuit 440 is operated in the first mode during intervals in which the quality of the received synchronous signal is higher than a quality level associated with time transfer messages received via the slave network port, if present.) Control circuit 440 controls RTC circuit 440 to operate in the second mode during second intervals in which the first network port is receiving time-transfer messages having a frequency traceability flag indicating TRUE and the clock source interface is not receiving a synchronous source signal having at least a predetermined quality level, and in the third mode during intervals in which the clock source interface is not receiving a synchronous source signal having at least the predetermined quality level and the first network port is not receiving time-transfer messages having a frequency traceability flag indicating TRUE. Control circuit 460 also sets frequency traceability flags in time-transfer messages sent via the second network port to a first value, indicating TRUE, when the RTC circuit is operating in the first mode and when the RTC circuit 440 is operating in the second mode and a traceability indication received in the time-transfer messages indicates TRUE, and to a second value, indicating FALSE, under each of two conditions: first, when the RTC circuit is operating in the third mode, and second, when the RTC circuit is operating in the second mode and the traceability indication received in the time-transfer messages indicates FALSE.

In some embodiments, the time-transfer protocol supported by data network node 400 is compliant to the Precision Clock Synchronization Protocol specified by IEEE Standard 1588-2008, and may also be compliant with the G8265.1. However, in other embodiments control circuit 460 is instead adapted to support a different time-transfer protocol, or a modified version of the IEEE 1588 protocol. Likewise, in some embodiments the clock source interface 450 is a synchronous Ethernet interface configured to operate as a synchronous Ethernet slave clock, but in others the clock source interface 450 is a Synchronous Optical Networking (SONET) interface or a Synchronous Digital Hierarchy (SDH) interface, or some other synchronous interface.

The operating intervals described in detail in the above description of data network node 400 do not necessarily represent all of the operating intervals of the node. In some embodiments, for example, debounce intervals are employed to avoid rapidly switching back-and-forth between operating modes. Thus, in some embodiments control circuit 460 is further configured to control the RTC circuit 440 to operate in the second mode during debounce intervals that immediately follow reestablishments of previously lost synchronous source signals.

In several embodiments, the control circuit 460 is further configured to control the RTC circuit 440 to update time-of-day during intervals in which the data network node 400 is not receiving time-transfer messages by using the synchronous signal from the clock source interface 450, when the synchronous signal is available, and by using the local clock signal 445 when the clock signal from the clock source interface 450 is not available. In some of these embodiments, this updating may reflect the application of a calibration factor based on previously observed differences between the local clock signal 445 and the synchronous signal and/or previously observed differences between the local clock signal 445 and a frequency derived from time-transfer timestamps.

As noted above, control circuit 460 in data network node 400 is configured to set frequency traceability flags in time-transfer messages sent via master network port 420 to a first value, indicating TRUE, when the RTC circuit 440 is operating in the first mode and when the RTC circuit 440 is operating in the second mode and a traceability indication received in the time-transfer messages indicates TRUE, and to a second value, indicating FALSE, when the RTC circuit is operating in the third mode and when the RTC circuit is operating in the second mode and the traceability indication received in the time-transfer messages indicates FALSE. In some embodiments, control circuit 460 is further configured to set an outgoing clock class field for time-transfer messages sent via the master network port 420, wherein the outgoing clock class field is based on a clock quality for the synchronous clock signal when the RTC 440 is operating in the first mode, is based on an incoming clock class field from received time-transfer messages when operating in the second mode, and is based on a quality of the local clock 445 when operating in the third mode.

In some embodiments, data network node 400 is capable of selective operation in either BC-S or BC-P mode. Accordingly, in some embodiments, control circuit 460 is further configured to disable the time-transfer slave interface 410 and operate in a primary boundary clock mode, responsive to an externally supplied configuration command. When operating in primary boundary clock mode, the control circuit 460 is configured to control the RTC circuit 440 to operate in the first mode during fourth intervals in which the clock source interface 450 is receiving a synchronous source signal and in the third mode in fifth intervals in which the clock source interface 450 is not receiving a synchronous source signal, and to set frequency traceability flags in time-transfer messages sent via a master network port 420 to a first value, indicating TRUE, when the RTC circuit 440 is operating in the first mode, and to a second value, indicating FALSE, otherwise. In these embodiments, control circuit 460 is also configured to set a grandmaster clock ID field and a sending clock ID field to the same value in each Announce message sent via a master network port 420, when operating in BC-P mode.

Figure 5:
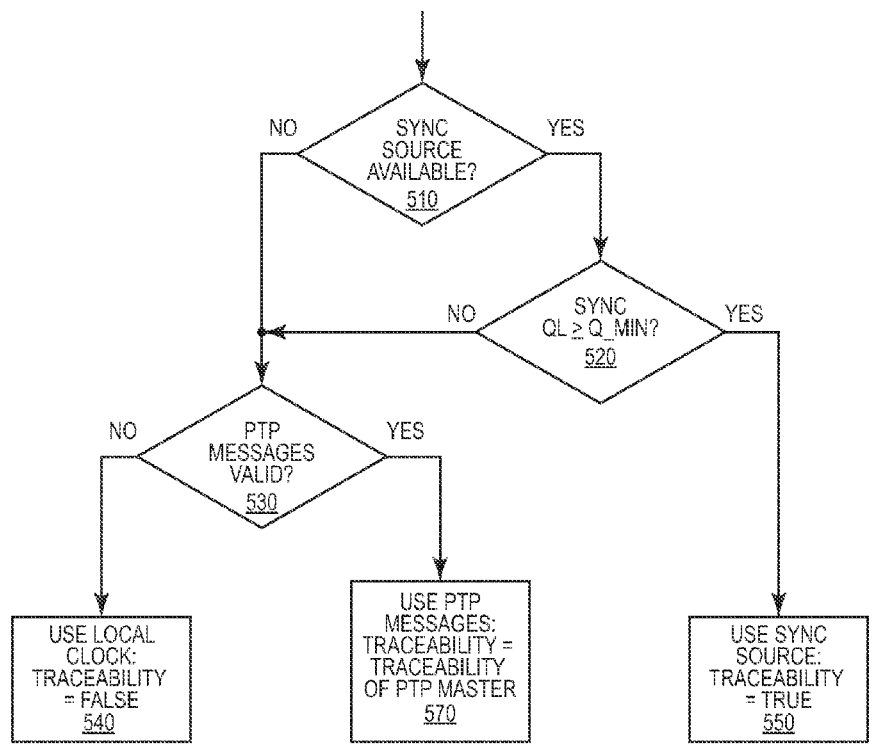
FIG. 5 is a process flow diagram illustrating an example method for operating a network node.

FIG. 5 is a process flow diagram illustrating an example method for operating a data network node. It should be appreciated that the illustrated method can be implemented in a node like the data network node 400 illustrated in FIG. 4. Accordingly, some of the possible variations of the method of FIG. 5 correspond directly to the several variations of data network node 400 discussed earlier.

As seen at block 510, the illustrated process begins with determining whether the clock source interface is receiving a synchronous signal. If so, a quality level (Sync QL) is evaluated, as shown in block 520, to determine whether it is at least at a predetermined quality level (Q_Min). If not, or if no synchronous signal at all is available, the process continues with determining whether valid PTP messages are being received, which includes determining whether the first network port is receiving time-transfer messages having a frequency traceability flag indicating TRUE, as shown at block 530. It should be noted that in Sync-E, the quality of each synchronous signal is carried in-band. A mapping defined by ITU determines how Sync-E/SDH clock quality is mapped to PTP clock class for telecom applications. As suggested earlier, determining whether a synchronous signal has at least a minimum quality level may be as simple as determining whether a "do not use" indication has been received for the synchronous signal, in some embodiments of the invention. In others, an explicit synchronous source quality level may be compared to a threshold quality level, or to a quality level for an available PTP master reference, such as the best available PTP master reference, to determine whether the synchronous signal source has an adequate clock quality.

Depending on which frequency sources are available (and, in some cases, depending on their relative qualities), the method continues with controlling the RTC circuit to operate in one of three modes. The first mode, shown at block 550, is used during first intervals in which the clock source interface is receiving a synchronous source signal and the quality of the synchronous signal meets or exceeds at least a predetermined quality level. In this mode, the synchronous signal is used—thus, the RTC frequency is driven by a clock signal from the clock source interface. In this mode, time transfer messages sent downstream include a traceability indication set to TRUE. The second mode, shown at block 570, is used during second intervals in which the first network port is receiving time-transfer messages having a frequency traceability flag indicating TRUE and a synchronous signal having the requisite quality is not being received t. In this mode, time-transfer messages received via a slave network port are used to derive a frequency source for the node—thus, the RTC frequency is driven by a clock signal derived from time-transfer messages received by the time-transfer slave interface. In this mode, downstream time transfer messages include a traceability indication set to match the traceability indication in time transfer messages received by the node's slave port. Finally, the third mode, shown at block 540, is used in third intervals in which the clock source interface is not receiving a synchronous source signal having the requisite quality and the first network port is not receiving time-transfer messages having a frequency traceability flag indicating TRUE. In this mode, the RTC is driven by a local clock signal, and the traceability indication in time transfer messages sent downstream is set to FALSE.

The time-transfer protocol used in the method illustrated in Figure is compliant to the Precision Clock Synchronization Protocol specified by IEEE Standard 1588-2008, in some embodiments, but may be another protocol in others. Likewise, the clock source interface from which the synchronous signal is derived is a synchronous Ethernet interface configured to operate as a synchronous Ethernet slave clock, in some embodiments, but may be a Synchronous Optical Networking (SONET) interface or a Synchronous Digital Hierarchy (SDH) interface, in others, or yet another synchronous interface in still other embodiments.

In some embodiments, the methods described above may further include controlling the RTC circuit to operate in the second mode during debounce intervals that immediately follow reestablishments of previously lost synchronous source signals. Likewise, some embodiments of these methods may further include controlling the RTC circuit to update time-of-day during intervals in which the data network node is not receiving time-transfer messages by using the synchronous signal from the clock source interface, when the synchronous signal is available, and by using the local clock signal when the clock signal from the clock source interface is not available. These and other embodiments, may still further include setting an outgoing clock class field for time-transfer messages sent via a master network port, wherein the outgoing clock class field is based on a clock quality for the synchronous clock signal when the RTC is operating in the first mode, is based on an incoming clock class field from received time-transfer messages when the RTC is operating in the second mode, and is based on a quality of the local clock when the RTC is operating in the third mode.

In another extension of the method illustrated in FIG. 5, steps are taken to switch the node from operating in a BC-S to a BC-P. Thus, some methods further include disabling the time-transfer slave interface and operating in a primary boundary clock mode, responsive to an externally supplied configuration command. These methods further include, when the node is operating in primary boundary clock mode, controlling the RTC circuit to operate in the first mode during fourth intervals in which the clock source interface is receiving a synchronous source signal and in the third mode in fifth intervals in which the clock source interface is not receiving a synchronous source signal, and setting frequency traceability flags in time-transfer messages sent via the master network port to a first value, indicating TRUE, when the RTC circuit is operating in the first mode, and to a second value, indicating FALSE, otherwise. These methods also include setting a grandmaster clock ID field and a sending clock ID field to the same value in each Announce message sent via the master network port, in some embodiments.

Figure 6:
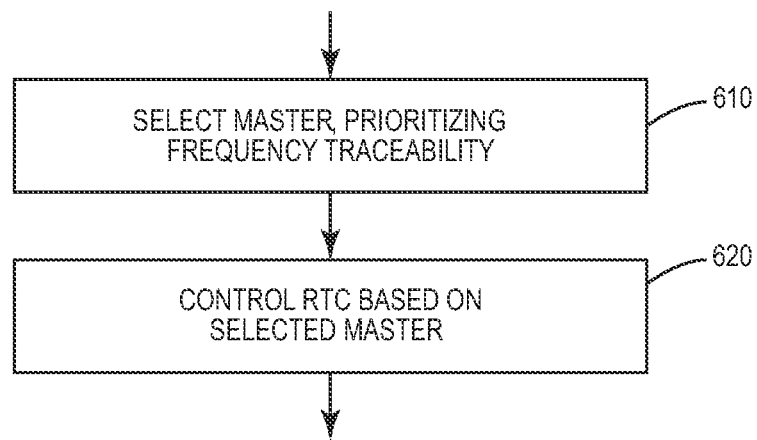
FIG. 6 is a process flow diagram illustrating an example method for selecting a master clock.

FIG. 6 is a process flow diagram illustrating an example method for selecting a master clock, which might be implemented, for example, in a data network node having at least one network port configured for operation as a time-transfer slave interface according to a precision time-transfer protocol, and a real-time clock (RTC) circuit configured to track time-of-day based on time-transfer messages received by the data network node.

As shown at block 610, the method includes selecting one of two or more master reference sources tracked via the at least one network port as a source for time-transfer data, based on frequency traceability field values and clock class field values in time-transfer messages received from the master reference sources, wherein said selecting prioritizes the frequency traceability field values over the clock class field values. The method continues, as shown at block 620, with controlling the RTC circuit to track time-of-day based on time-transfer messages received from the selected master reference source, while ignoring time-transfer messages received from other master reference sources.

Once again, the time-transfer protocol is compliant to the Precision Clock Synchronization Protocol specified by IEEE Standard 1588-2008, in some embodiments, but may be according to another standard or to a modification of the IEEE 1588 standard in others. In several embodiments, the selection of one of the master reference source is further based on a number of packet timing signal fail indications for each of the master reference sources, or a type of master reference connected to each network port, or both.

Figure 7:
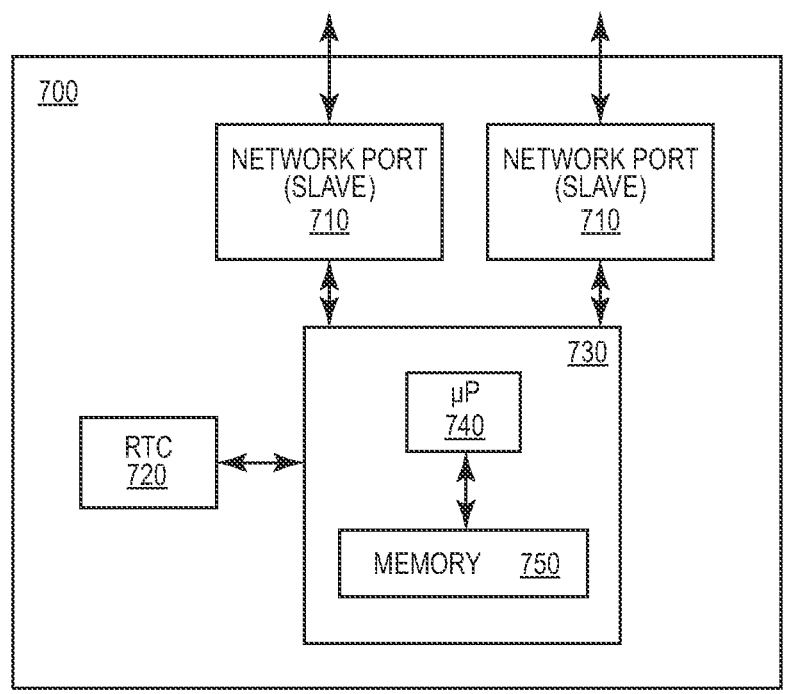
FIG. 7 is a block diagram illustrating some of the components of a data network node configured for operation as a slave.

FIG. 7 illustrates an example data network node 700, configured for operation as a PTP slave and to carry out the method illustrated in FIG. 7 or a variant thereof. Data network node 700 includes two network ports 710, each configured for operation as a time-transfer slave interface according to a precision time-transfer protocol. Of course, other embodiments might include more than two time-transfer slave interfaces, and other embodiments may include more than two network ports 710 or even a single network port 710, since a single network port can be configured to track multiple time-transfer master references. Data network node also includes a real-time clock (RTC) circuit 720, which is configured to track time-of-day based on time-transfer messages received by the data network node. Finally, data network node includes a control circuit 730, which is connected to the network ports 710 and the RTC circuit 720 and is configured to select one of two or more master reference sources as a source for time-transfer data, based on frequency traceability field values and clock class field values in time-transfer messages received from the master reference sources at the network ports 710. This selection prioritizes the frequency traceability field values over the clock class field values. Control circuit 730, which in the embodiment pictured in FIG. 7 includes a microprocessor 740 coupled to a memory 750, is also adapted (e.g., using program instructions stored in memory 750), to control the RTC circuit 720 to track time-of-day based on time-transfer messages received from the selected master reference source, while ignoring time-transfer messages received from other master reference sources.

As will be readily understood by those familiar with network device design, several of the various functional blocks of the data network nodes described herein, such as the example data network node 400 of FIG. 4 and the example network node 700 of FIG. 7, may be implemented using digital logic and/or one or more microcontrollers, microprocessors, or other digital hardware. Several of the illustrated functions may be implemented together, such as in a single application-specific integrated circuit (ASIC), or in two or more separate devices with appropriate hardware and/or software interfaces between them. Further, several of the functional elements of data network node may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of network devices will appreciate the cost, performance, and maintenance tradeoffs inherent in these design choices.

With these and other variations and extensions of the present invention in mind, it should be appreciated that the foregoing description and the accompanying drawings represent non-limiting examples of the methods and apparatus taught herein for managing a time-transfer protocol in a data network node. As such, the inventive apparatus and techniques taught herein are not limited by the foregoing description and accompanying drawings. Instead, the present invention is limited only by the following claims and their legal equivalents.

What is claimed is:

1. A data network node, comprising:
a clock source interface configured for connection to a synchronous clock source supplied from a remote node;
first and second network ports configured for operation as a time-transfer slave interface and a time-transfer master interface, respectively, according to a precision time-transfer protocol;
a real-time clock (RTC) circuit configured to supply time-of-day data for time-transfer messages sent via the second network port and to selectively operate in a first mode, wherein the RTC frequency is driven by a clock signal from the clock source interface, a second mode, wherein the RTC frequency is driven by a clock signal derived from time-transfer messages received by the time-transfer slave interface, and a third mode, wherein the RTC frequency is driven by a local clock signal; and
a control circuit connected to the network ports and the RTC circuit and configured to:
determine whether the clock source interface is receiving a synchronous signal having at least a predetermined quality level and whether the first network port is receiving time-transfer messages having a frequency traceability flag indicating TRUE;
control the RTC circuit to operate in the first mode during first intervals in which the clock source interface is receiving a synchronous source signal having at least the predetermined quality level, in the second mode during second intervals in which the clock source interface is not receiving a synchronous source signal having at least the predetermined quality and the first network port is receiving time-transfer messages having a frequency traceability flag indicating TRUE, and in the third mode in third intervals in which the clock source interface is not receiving a synchronous source signal having at least the predetermined quality and the first network port is not receiving time-transfer messages having a frequency traceability flag indicating TRUE; and set frequency traceability flags in time-transfer messages sent via the second network port to a first value, indicating TRUE, when the RTC circuit is operating in the first mode and when the RTC circuit is operating in the second mode and a traceability indication received in the time-transfer messages indicates TRUE, and to a second value, indicating FALSE: (a) when the RTC circuit is operating in the third mode; and (b) when the RTC circuit is operating in the second mode and the traceability indication received in the time-transfer messages indicates FALSE.

2. The data network node of claim 1, wherein the time-transfer protocol is compliant to the Precision Clock Synchronization Protocol specified by IEEE Standard 1588-2008 (IEEE 1588).

3. The data network node of claim 1, wherein the clock source interface is a synchronous Ethernet interface configured to operate as a synchronous Ethernet slave clock.

4. The data network node of claim 1, wherein the clock source interface comprises a Synchronous Optical Networking (SONET) interface or a Synchronous Digital Hierarchy (SDH) interface.

5. The data network node of claim 1, wherein the control circuit is further configured to control the RTC circuit to operate in the second mode during debounce intervals that immediately follow reestablishments of previously lost synchronous source signals.

6. The data network node of claim 1, wherein the control circuit is further configured to control the RTC circuit to update time-of-day during intervals in which the data network node is not receiving time-transfer messages by using the synchronous signal from the clock source interface, when the synchronous signal is available and has at least the predetermined quality level, and by using the local clock signal when the synchronous signal from the clock source interface is not available or does not have at least the predetermined quality level.

7. The data network node of claim 1, wherein the control circuit is further configured to set an outgoing clock class field for time-transfer messages sent via the second network port, wherein the outgoing clock class field is based on a clock quality for the synchronous clock signal when the control circuit is operating in the first mode, is based on an incoming clock class field from received time-transfer messages when operating in the second mode, and is based on a quality of the local clock signal when operating in the third mode.

8. The data network node of claim 1, wherein the control circuit is configured to determine whether the clock source interface is receiving a synchronous signal having at least a predetermined quality level by determining whether the data network node has received a "do not use" indication associated with the synchronous signal.

9. The data network node of claim 1, wherein the control circuit is configured to determine whether the clock source interface is receiving a synchronous signal having at least a predetermined quality level by determining whether a quality level associated with the received synchronous signal is greater than or equal to a quality level associated with time transfer messages received at the first network port.

10. The data network node of claim 2, wherein the control circuit is further configured to:
disable the time-transfer slave interface and operate in a primary boundary clock mode, responsive to an externally supplied configuration command; and,
when operating in primary boundary clock mode, to:
control the RTC circuit to operate in the first mode during fourth intervals in which the clock source interface is receiving a synchronous source signal having at least the predetermined quality level and in the third mode in fifth intervals in which the clock source interface is not receiving a synchronous source signal having at least the predetermined quality level;
set frequency traceability flags in time-transfer messages sent via the second network port to a first value, indicating TRUE, when the RTC circuit is operating in the first mode, and to a second value, indicating FALSE, otherwise;
set a grandmaster clock ID field and a sending clock ID field to the same value in each Announce message sent via the second network port.

11. A method, in a data network node having a clock source interface configured for connection to a synchronous clock source supplied from a remote node, first and second network ports configured for operation as a time-transfer slave interface and a time-transfer master interface, respectively, according to a precision time-transfer protocol, and a real-time clock (RTC) circuit configured to supply time-of-day data for time-transfer messages sent via the second network port and to selectively operate in a first mode, wherein the RTC frequency is driven by a clock signal from the clock source interface, a second mode, wherein the RTC frequency is driven by a clock signal derived from time-transfer messages received by the time-transfer slave interface, and a third mode, wherein the RTC frequency is driven by a local clock signal, the method comprising:
determining whether the clock source interface is receiving a synchronous signal having at least a predetermined quality level and whether the first network port is receiving time-transfer messages having a frequency traceability flag indicating TRUE;
controlling the RTC circuit to operate in the first mode during first intervals in which the clock source interface is receiving a synchronous source signal having at least the predetermined quality level, in the second mode during second intervals in which the first network port is receiving time-transfer messages having a frequency traceability flag indicating TRUE and the clock source interface is not receiving a synchronous source signal having at least the predetermined quality level, and in the third mode in third intervals in which the clock source interface is not receiving a synchronous source signal having at least the predetermined quality level and the first network port is not receiving time-transfer messages having a frequency traceability flag indicating TRUE; and
setting frequency traceability flags in time-transfer messages sent via the second network port to a first value, indicating TRUE, when the RTC circuit is operating in the first mode and when the RTC circuit is operating in the second mode and a traceability indication received in the time-transfer messages indicates TRUE, and to a second value, indicating FALSE: (a) when the RTC circuit is operating in the third mode; and (b) when the RTC circuit is operating in the second mode and the traceability indication received in the time-transfer messages indicates FALSE.

12. The method of claim 11, wherein the time-transfer protocol is compliant to the Precision Clock Synchronization Protocol specified by IEEE Standard 1588-2008 (IEEE 1588).

13. The method of claim 11, wherein the clock source interface is a synchronous Ethernet interface configured to operate as a synchronous Ethernet slave clock.

14. The method of claim 11, wherein the clock source interface comprises a Synchronous Optical Networking (SONET) interface or a Synchronous Digital Hierarchy (SDH) interface.

15. The method of claim 11, further comprising controlling the RTC circuit to operate in the second mode during debounce intervals that immediately follow reestablishments of previously lost synchronous source signals.

16. The method of claim 11, further comprising controlling the RTC circuit to update time-of-day during intervals in which the data network node is not receiving time-transfer messages by using the synchronous signal from the clock source interface, when the synchronous signal is available and has at least the predetermined quality level, and by using the local clock signal when the clock signal from the clock source interface is not available or does not have at least the predetermined quality level.

17. The method of claim 11, further comprising setting an outgoing clock class field for time-transfer messages sent via the second network port, wherein the outgoing clock class field is based on a clock quality for the synchronous clock signal when the control circuit is operating in the first mode, is based on an incoming clock class field from received time-transfer messages when operating in the second mode, and is based on a quality of the local clock signal when operating in the third mode.

18. The method of claim 12, further comprising
disabling the time-transfer slave interface and operating in a primary boundary clock mode, responsive to an externally supplied configuration command, and, when operating in the primary boundary clock mode:
controlling the RTC circuit to operate in the first mode during fourth intervals in which the clock source interface is receiving a synchronous source signal having at least the predetermined quality level and in the third mode in fifth intervals in which the clock source interface is not receiving a synchronous source signal having at least the predetermined quality level;
setting frequency traceability flags in time-transfer messages sent via the second network port to a first value, indicating TRUE, when the RTC circuit is operating in the first mode, and to a second value, indicating FALSE, otherwise;
setting a grandmaster clock ID field and a sending clock ID field to the same value in each Announce message sent via the second network port.

* * * * *